Feb. 4, 1930. A. T. SEAMAN 1,745,647
RECORDING DEVICE FOR METERS
Filed July 20, 1926 4 Sheets-Sheet 1
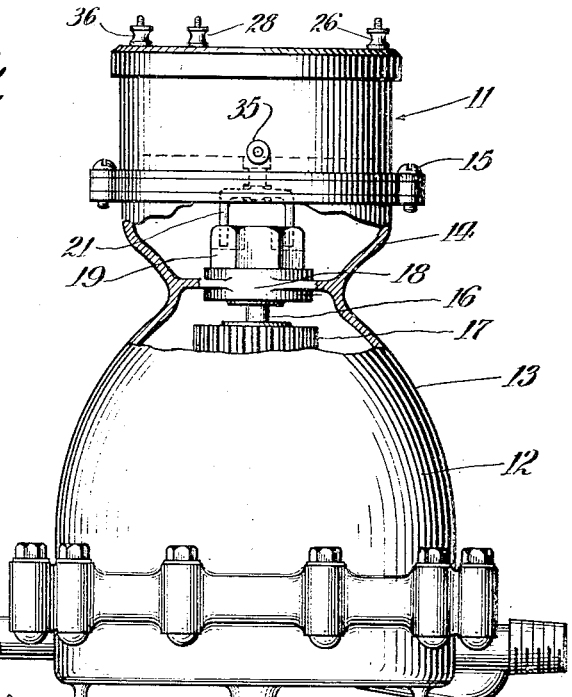
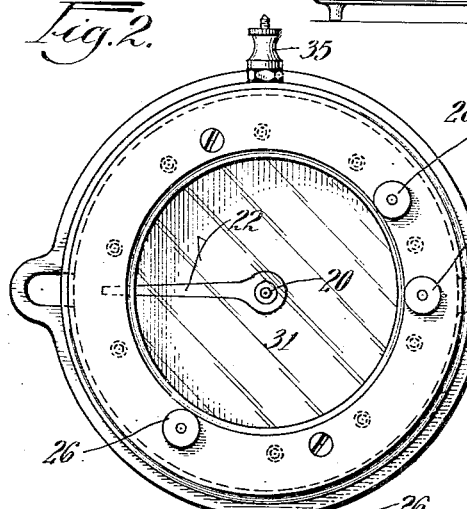
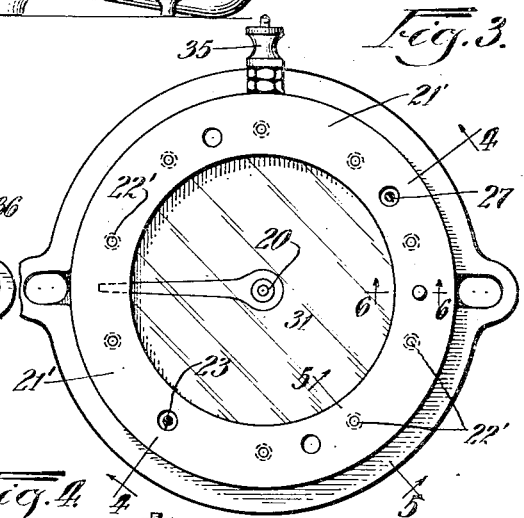
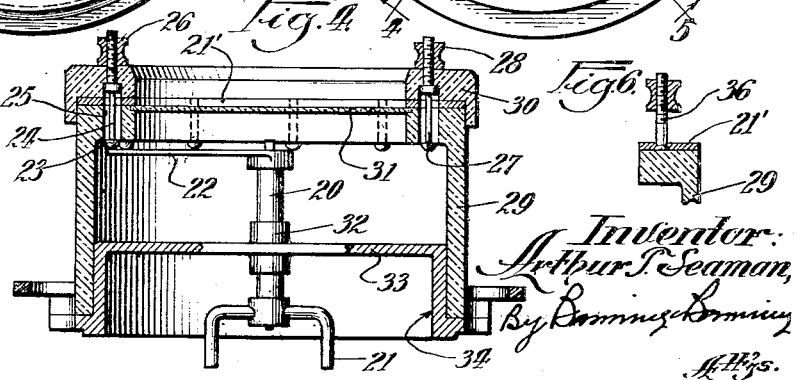
Inventor:
Arthur T. Seaman,

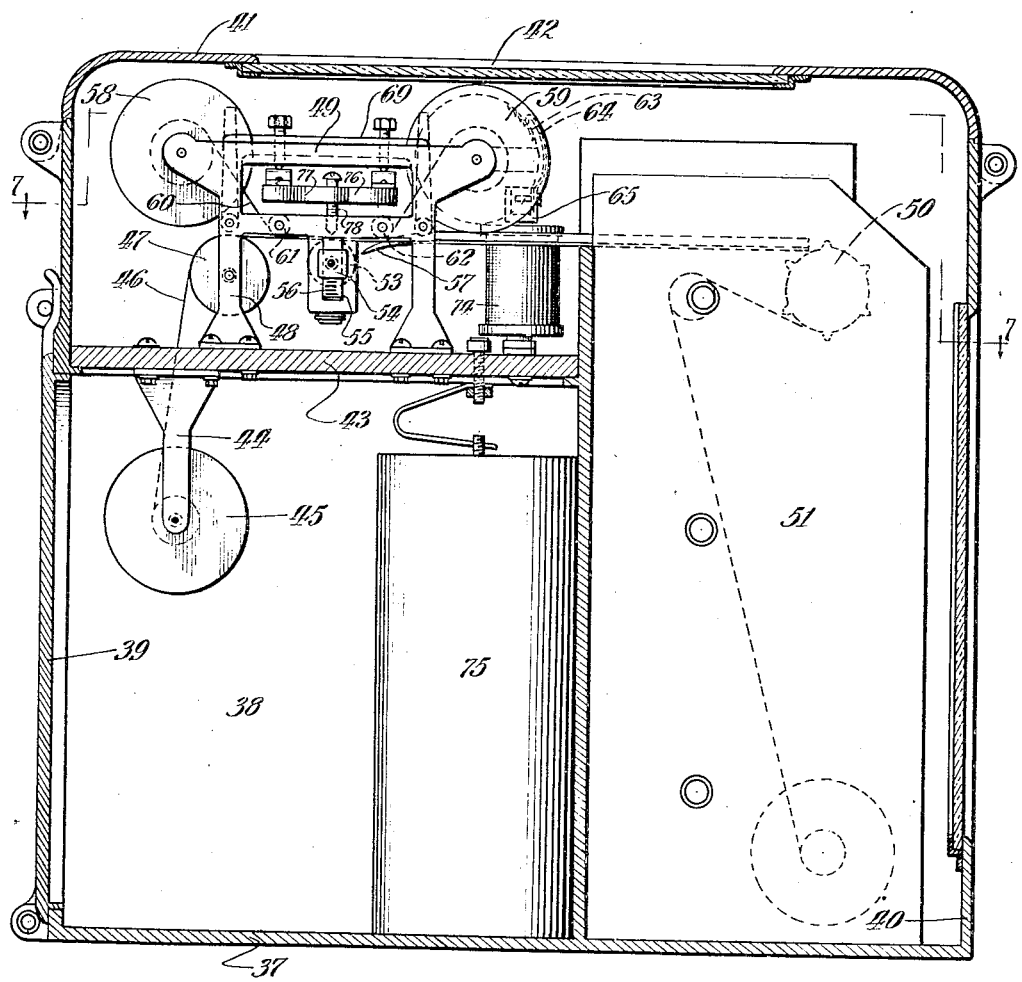

Feb. 4, 1930.

A. T. SEAMAN 1,745,647

RECORDING DEVICE FOR METERS

Filed July 20, 1926    4 Sheets-Sheet 3

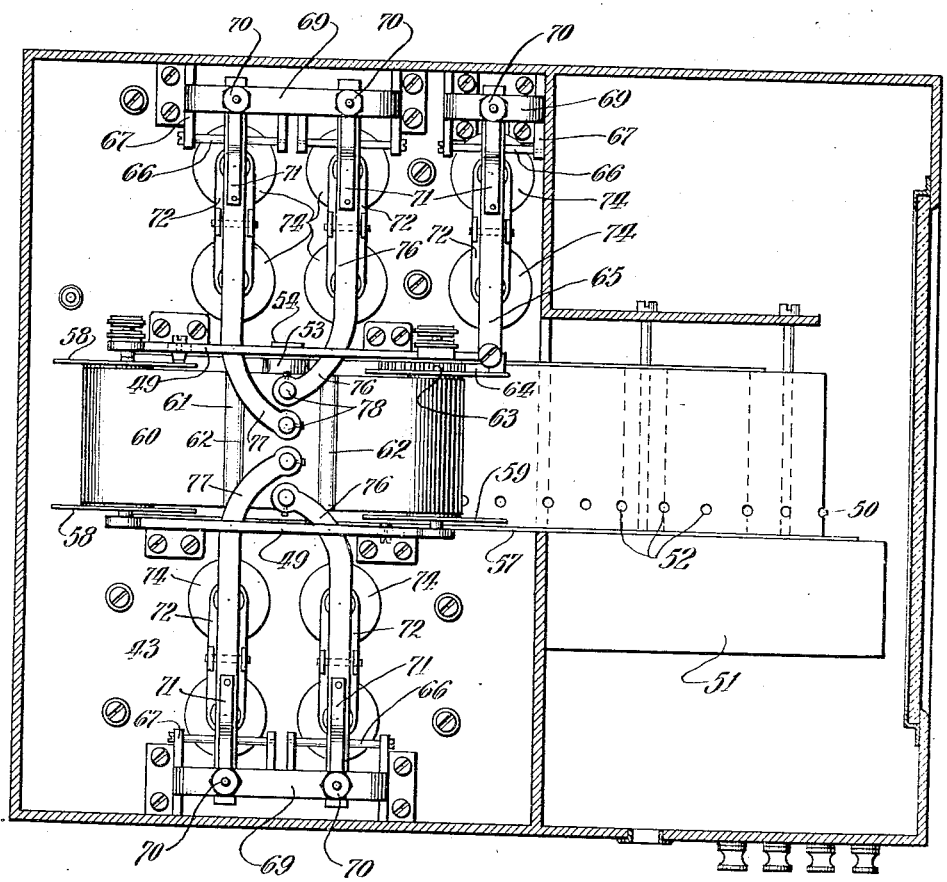

Patented Feb. 4, 1930

1,745,647

UNITED STATES PATENT OFFICE

ARTHUR T. SEAMAN, OF CHICAGO, ILLINOIS

RECORDING DEVICE FOR METERS

Application filed July 20, 1926. Serial No. 123,649.

The device of the present invention is intended primarily for use in connection with and as an attachment to a water meter, although it is equally adapted for other uses in which it is desired to conserve a permanent record of the indications afforded by a meter or similar instrument. In the case of water meters as usually constructed, it is customary to provide a dial and pointer which moves around the face of the dial at a speed commensurate with the volume of water flowing at any particular instant. By taking readings at recurrent intervals it is possible to determine the aggregate amount of water flow between readings, but such an instrument affords no permanent record of the volume of flow at any particular instant, so that it is impossible to determine at what times the flow reaches a peak and when the flow is scanty, which detailed record is frequently desirable for various reasons.

The present invention is intended to afford such a record which will indicate variations within short time intervals in the rate of flow, so that it will be possible to secure readings which will indicate the volume of flow at any period of time during which the record is maintained.

Further objects and details will appear from a description of the invention in connection with the accompanying drawings wherein—

Figure 1 is a side elevation of a water meter of standard construction having the contact unit of the present invention attached thereto;

Fig. 2 is a face view of such contact unit;

Fig. 3 is a similar view with the outer rim portion removed;

Fig. 4 is a sectional view taken on line 4—4 of Fig. 3;

Figs. 5 and 6 are details of the rim portion of the contact unit;

Fig. 7 is a longitudinal sectional elevation through the recording unit of the present invention;

Fig. 10 is a sectional plan view of the recording mechanism showing the casing in section taken on line 10—10 of Fig. 7.

Figure 8:
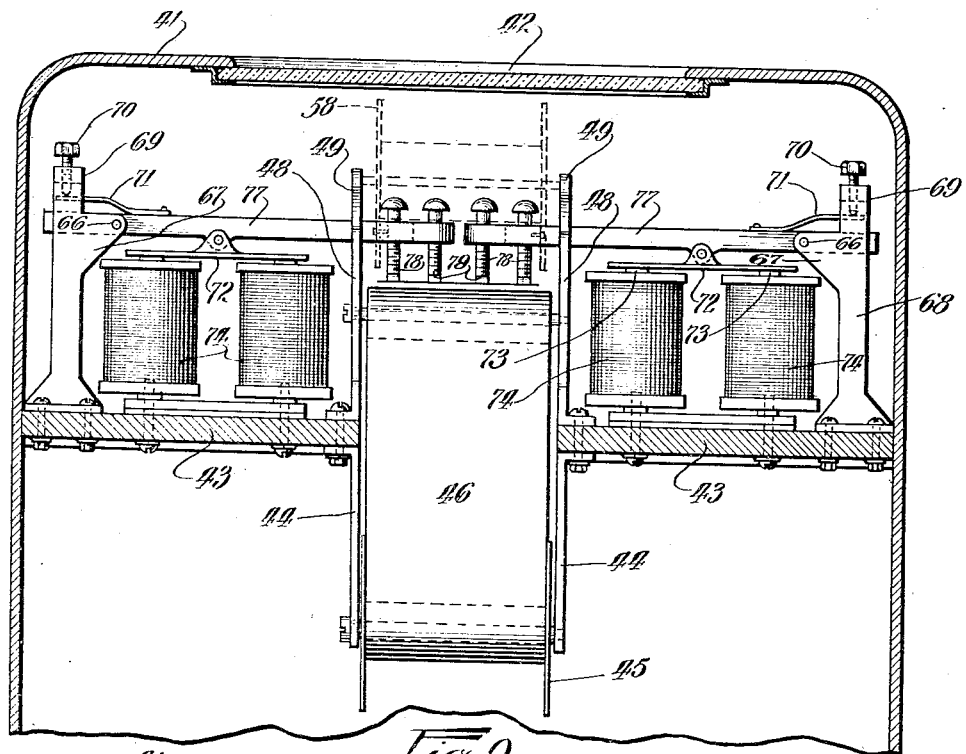
Fig. 8 is a cross sectional elevation of the same with portions removed for the sake of clarity.
Figure 9:
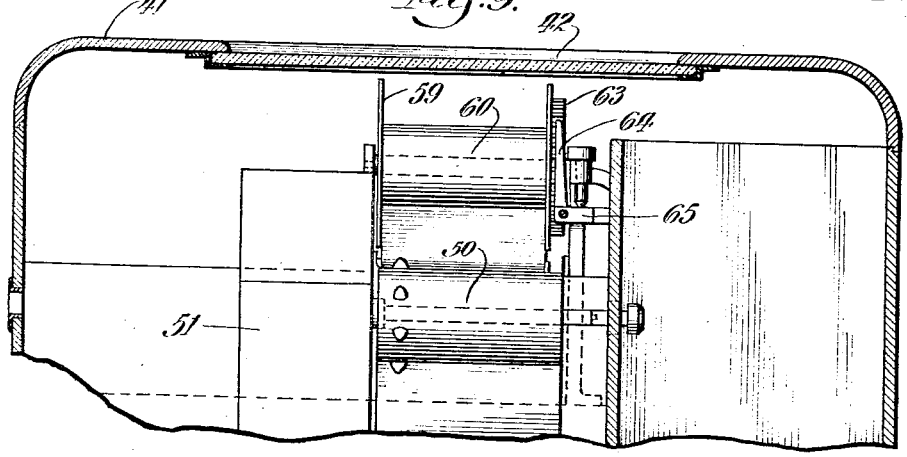
Fig. 9 is a detail of the ribbon feed.

The contact unit 11 of the present invention is mounted upon a water meter 12 of standard construction, which water meter comprises a dome-shaped casing 13 merging upwardly into a flared attaching head 14 to which the contact unit is secured by means of screws 15 or the like. It is not deemed necessary to illustrate the interior construction of the water meter which, however, includes a vertical shaft 16 having a gear 17 mounted thereon. The vertical shaft is journaled through a journal cross head 18, and the shaft at its upper end carries a clutch head 19 which serves to afford a connection with the special mechanism comprising the present invention. This mechanism is substituted in lieu of the dial and indicating finger customarily employed to give a reading on a water meter.

The speed of rotation of the shaft 16 will be commensurate with the volume flow of water, so that the mechanism driven from the said shaft will secure a speed of rotation equally commensurate with the water flow, and in order to utilize the shaft 16 as a suitable source of power, the contact unit 11 is provided with a stub shaft 20 which has secured at its lower end a pair of clutch fingers 21 which engage with properly spaced slots or recesses in the head 19. The shaft 20 carries a contact finger 22, the outer or free end of which rotates immediately beneath a conducting ring 21' of brass or the like provided at equal intervals with a series of contact studs 22' (nine in number as shown), which contact studs will be successively contacted by the tip end of the finger 22, so that during a complete rotation nine of such contacts will be engaged for the purpose of recurrently closing the circuit to effect a record mark in a manner to be hereinafter described. It is desirable that every tenth contact be specially indicated. Special mechanism is provided to record each revolution of the contact finger. For this purpose, in place of a tenth contact stud 22' which may conveniently be termed the units order studs, I provide a single tens order stud 23 which is formed on the under end of a stem 24 which passes freely through an aperture 25 in the conducting ring 21' and terminates at its upper end in a binding post 26, best shown in Fig. 4.

In addition to the units and tens order contact studs, I also provide a ribbon feed contact stud 27 similar in all respects to the stud 23, which ribbon feed stud is located at an intermediate position between two of the units order studs, as best shown in Fig. 3. The stud 27 terminates in a binding post 28, and this stud, like the stud 23, is out of contact with the conducting ring 21'.

The mechanism above described is housed within a fibre casing 29 of cylindrical shape which carries a flanged cap ring 30 seated upon the conducting ring 21', which latter bears against the rim of a glass plate 31 constituting a window for inspection of the interior of the contact unit. The shaft 20 is journaled through a bushing 32 carried by a cross partition plate 33 which is formed on a metallic bushing 34 upon which the cylindrical housing 29 is mounted.

A binding post 35 enters the side of the housing and engages the bushing 34 making an electrical contact therewith, thereby establishing a line of electrical conduction through the shaft 20 and the finger 22, and every time the finger 22 engages one of the studs, a circuit will be closed and the mechanism actuated in a manner hereinafter to be described.

The conducting ring 21', shown in Fig. 6, is provided with a binding post 36 to which a suitable circuit wire is attached for maintaining the circuit recurrently closed by contact of the finger with any one of the units order contact studs. The recording mechanism which co-operates with the contact mechanism heretofore described is enclosed within a box comprising a floor 37, side walls 38, end walls 39 and 40, and a top 41 provided with a window 42. The recording mechanism may be located at any convenient point either in proximity to or at a distance from the contact unit, suitable wiring connections being established between the contact and recording sections of the mechanism.

The housing or casing for the recording mechanism is provided with a cross partition 43 which affords a mounting or bed plate for the recording mechanism now to be presently described. The bed plate 43 is provided with hangers 44 which afford a mounting for a spool 45 which carries a paper record strip 46 extending upwardly from the spool and passing over a guide roller 47 journaled between the uprights 48 of a frame 49. The paper strip thence passes laterally in a horizontal direction and is carried over a sprocket feed drum 50 which is positively driven by a clockwork mounted within a casing 51. The clockwork may be of any suitable or well known description adapted to impart a uniform feeding speed to the paper strip which is provided along its edge with a series of sprocket holes 52 suitably spaced to engage with the sprocket teeth on the drum 50 which prevents slippage and maintains uniformity in the feeding rate.

The paper strip, after passing the guide roller 47, passes over a center supporting roller 53 (Fig. 7), which is carried by journal boxes 54 slidably mounted within slotted brackets 55 depending from the frame 49, which journal boxes rest upon springs 56, the arrangement being such as to afford a yielding support for the roller 53 over which the paper strip rides. Beyond the roller 53 in the direction of the paper feed, is a shoe 57 which underlies and supports the paper strip until it is engaged by the sprocket wheel 50.

The frame 49 serves as a support for a pair of ribbon spools 58 and 59 which carry a typewriter ribbon 60. The ribbon is fed down beneath a pair of guide rollers 61 and 62 bringing it into close proximity to and immediately above the section of the paper strip overlying the yielding roller 53. The feeding of the ribbon at recurrent intervals is effected by means of a ratchet wheel 63 mounted on the end of the drum 59 (see Fig. 10), which ratchet wheel is engaged by a spring dog 64 mounted on the end of a lever arm 65 which is pivoted at its opposite ends upon a cross pin 66 carried between inwardly extending arms 67 formed on the upper portion of a standard 68. The upper portion of the standard terminates in an open arch 69 under which the rear end of the lever arm 65 extends. The arch in the center is provided with an adjusting screw 70, the lower end of which bears upon the tail end of a flat spring 71 which is rigidly secured at its forward end to its lever arm so that, by adjusting the screw 70, a variable spring tension may be imposed upon the lever arm 65 tending to lift the inner end thereof which carries the spring dog.

The lever arm 65 has pivoted thereto, a little to the rear of its center, an equalizer bar 72, the ends of which overlie the pole pieces 73 of a pair of magnetic coils 74 which are in circuit with the contact stud 27 of the contact unit, and with a suitable source of electrical energy, as, for instance, a battery 75, so that when the finger 22 contacts the stud 27, the circuit will be closed and the magnet energized, thereby drawing down the inner end of the lever arm 65 which, in turn, draws down upon the spring dog 64, so that the ribbon will be fed forward a distance equal to one tooth of the ratchet. As soon as the contact finger 22 passes out of contact with the ribbon feeding stud 27, the circuit will be broken, and the spring 71 will effect a lifting of the inner end of the lever arm which will, in turn, lift the dog into position to engage the next succeeding tooth on the ratchet wheel. Suitable impressions are inscribed upon the moving paper strip by the action of mechanism identical with that heretofore described for operating the ribbon feed.

Referring particularly to Fig. 10, it will be noted that provision is made for inscribing the unit contacts by the action of a relatively short lever 76, and for similarly inscribing the tens order record by the action of a relatively longer lever 77. Each of the levers at its free end carries a wedge-shaped stylus 78 in the form of a screw which may be adjusted to bear with the proper degree of firmness against the rear or outer face of the typewriter ribbon, and in order to imprint the record in the form of a series of cross dashes, the lower ends 78 of the styluses are preferably made wedge-shaped with their long dimension transverse to the line of movement of the paper, so that momentary contact against the ribbon will inscribe short cross lines, but if the contact be maintained for any considerable period of time a broad stripe will be imprinted.

In order that the individual records made by the units order and tens order contacts may be easily distinguished, it is desirable that the levers 76 and 77 shall be of different lengths so that the shorter arm will inscribe a record near the margin of the paper strip, while the longer arm will inscribe a record near the center of the strip, and in order that the records thus inscribed may be in proper timed relation to the paper strip, it is essential that the free ends of the two lever arms shall be transversely aligned across a given portion of the record strip, so that, as shown, the free ends of the arm are bent toward one another to bring the respective styluses in transverse alignment.

The instrument, as shown in the drawings, is a duplicate instrument adapted to make two separate records along opposite margins of a single record strip which is a convenient method of recording the readings of different meters, but it will be understood that the present invention has reference particularly to a single instrument comprising a single ribbon feed and a pair of recording arms, and that the use of such parts in duplicate is a mere matter of convenience, since it permits a single paper strip feeding mechanism to be employed in connection with duplicate records.

The arrangement and mounting for the levers 76 and 77 is identical with that heretofore described, with respect to the arm 65 and associated parts, so that it is not deemed necessary to repeat the description heretofore given. The arm 76 which, for purposes of illustration, may be considered as the units order record arm, is controlled by a magnet which is in circuit with the contact finger 22 and the conducting ring 21 with the nine contact studs 22' depending therefrom, so that every time the finger 22 contacts one of said studs an appropriate circuit will be closed, and the lever 76 with its stylus drawn down into contact with the ribbon, thereby imprinting, in each instance, a dash upon the constantly moving paper strip.

When the contact finger 22 has completed a rotation, it will similarly close the circuit which actuates the tens order lever 77, so that a dash will be recorded upon the inner portion of the record strip devoted to the tens order record. It is not deemed necessary to illustrate the wiring arrangement for controlling the respective magnets which is of a character commonly employed in connection with electro-magnets or solenoids of the character here employed.

The operation of the device may be briefly summarized as follows: The paper record strip will be moved constantly at a fixed speed, so that units of length of the record strip will indicate fixed intervals of time. The rate of flow of water through the meter will control the rotation of the contact finger at a rate during each instance commensurate with the volume flow of water, so that the contact finger will engage the units and tens order contact studs at variable intervals of time depending upon variable conditions in the volume flow of the water. During each rotation of the contact finger, units order impressions will be imprinted upon a selected portion of the paper strip, thereafter a tens order impression will be recorded, and by observing the spaced arrangement of the impressions thus inscribed the volume flow at any stated period of time can be determined. The ribbon will be fed forward one tooth after each complete rotation of the contact finger, and the ribbon feed will occur in each instance during an interval of time, while the styluses are lifted from the ribbon, so that there can be no liability of tearing the ribbon by feeding forward the same during the time when one of the styluses is in contact therewith.

The device is simple in construction and reliable in operation, and although it has been described with particular reference to its applicability to its use in conjunction with a water meter, it is obvious that it may be used with equal facility in connection with other classes of meters or the like in which the flow of liquid, or other substance, occasions a rotating movement of the meter mechanism commensurate with the rate of flow of the liquid through the instrument.

Although the invention has been described with particularity as to details, it is not intended to limit the invention to the precise mechanism shown and described unless so indicated in the claims, and in referring to the typewriter ribbon it will be understood that equivalent impression means may be substituted in lieu thereof, if desired.

I claim:

1. In a recording mechanism of the class described, a record strip, means for driving the same, a rotating member, means for indicating parts of rotations of said member on said record strip, and separate means for indication on said record strip full rotations of said member.

2. In a recording mechanism of the class described, a record strip, means for driving the same, a rotating member, means for indicating parts of rotations of said member on said record strip, and separate means for indication at a different level on said record strip full rotations of said member.

ARTHUR T. SEAMAN.